Sept. 29, 1953 R. CASAS-ROBERT ET AL 2,653,557
SEWING MACHINE
Filed Dec. 8, 1950 8 Sheets-Sheet 1

INVENTORS
Ramon Casas-Robert
Jean Court.

BY

Emory L. Groff
ATTORNEY

Fig. 4

INVENTORS
Ramon Casas-Robert
Jean Court.

Sept. 29, 1953  R. CASAS-ROBERT ET AL  2,653,557
SEWING MACHINE

Filed Dec. 8, 1950  8 Sheets-Sheet 4

INVENTORS
Ramon Casas-Robert
Jean Court.

BY  *Emory L. Groff*

ATTORNEY

Sept. 29, 1953   R. CASAS-ROBERT ET AL   2,653,557
SEWING MACHINE

Filed Dec. 8, 1950   8 Sheets-Sheet 5

Fig. 7

INVENTORS
Ramon Casas-Robert
Jean Court.

BY Emory L. Groff
ATTORNEY

Sept. 29, 1953   R. CASAS-ROBERT ET AL   2,653,557
SEWING MACHINE
Filed Dec. 8, 1950   8 Sheets-Sheet 7

INVENTORS
Ramon Casas-Robert
Jean Court.
BY Emory L. Groff
ATTORNEY

Sept. 29, 1953 R. CASAS-ROBERT ET AL 2,653,557
SEWING MACHINE
Filed Dec. 8, 1950 8 Sheets-Sheet 8

INVENTORS
Ramon Casas-Robert
Jean Court.

BY
Emory L. Groff
ATTORNEY

Patented Sept. 29, 1953

2,653,557

UNITED STATES PATENT OFFICE 2,653,557

SEWING MACHINE

Ramon Casas-Robert and Jean Court, Geneva, Switzerland, assignors to Mefina S. A., Binningen, a corporation of Switzerland Application December 8, 1950, Serial No. 199,776
In Switzerland December 17, 1949

12 Claims. (Cl. 112—98)

The present invention relates to a sewing machine which is convertible at the will of the user into a simple sewing machine or into a zig-zag machine capable of effecting automatically zig-zag sewing of variable amplitude capable of being varied in a predetermined manner and also capable of carrying out zig-zag sewing with multiple stitches, or even into a machine capable of effecting automatically sewing with more complex ornamental stitching, obtained by complementary movements of the fabric, of variable amplitude and direction, varying in a predetermined manner, whilst retaining in all cases the possibility of effecting normal sewing as also darning. These types of machines provided with supplementary mechanical elements, relatively to a simple machine, are necessarily more expensive. The idea is thus to enable the user to purchase a simple sewing machine, but which is convertible, by means of the addition of predetermined mechanical members which can be purchased separately.

For this purpose the object of the present invention is a sewing machine of which the needle-carrying bar is mounted on a support oscillating on a vertical axis and which is distinguished from known machines by the fact that it is provided on the one hand with a securing device for retaining the said support in a stationary mean position, the framework being on the other hand provided with seatings for securing a removable support adapted to receive at least a portion of the mechanical accessory members controlling the movements of the oscillating support as also those of the feeding device and enabling the machine, after removal of the securing device of the support of the needle-carrying bar, to be converted either into a zig-zag machine capable of carrying out automatically zig-zag sewing of variable amplitude, varying in a predetermined manner and also capable of carrying out automatically zig-zag sewing with multiple stitches, or into a machine capable of carrying out sewing with more complex stitches of ornamentation, obtained by complementary automatic movements of the fabric, of an amplitude and direction varying in a predetermined manner, whilst retaining in all cases the possibility of carrying out normal sewing and darning.

Two forms of construtcion of the subject of the invention are shown diagrammatically and by way of example in the accompanying drawings, wherein.

Figs. $9a$ to $9i$ show a portion of the different sewings which can be carried out with a machine such as is shown in Fig. 8.

Figure 1:
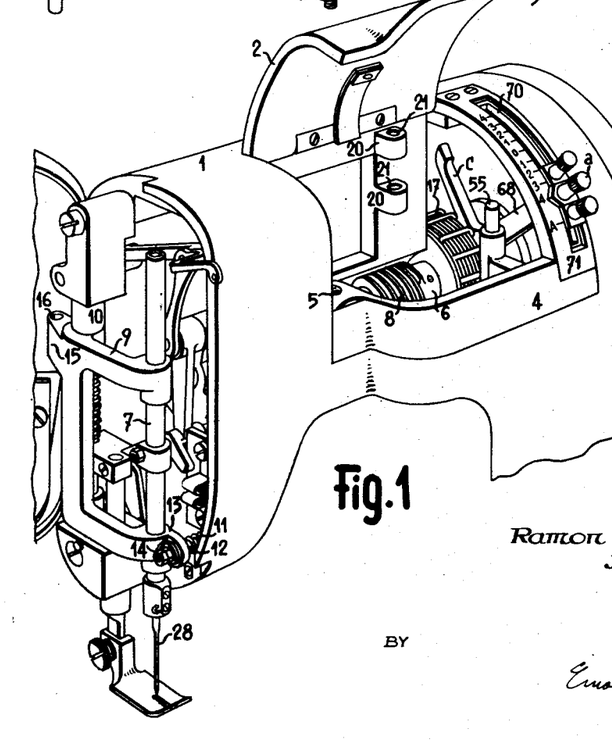
Fig. 1 is a perspective view of the needle-carrying arm of the machine conceived as a simple machine according to the first form of construction.

With reference to Fig. 1 it will be seen that the casing 1 of the machine is provided with an opening closed by a hinged cover 2. When it is closed the edge 3 of the cover comes into contact with a part secured removably to the framework of the machine by two screws 5, of which only one is visible in the drawing.

Opposite this opening of the casing 1, the shaft 6, controlling the movements of the needle-carrying bar 7, carries a worm 8. The needle-carrying bar 7 is mounted in a support 9 oscillating about a spindle 10. The support 9 is subjected to the action of a spring 11 which tends always to push it into its outer position of oscillation. This support is held, against the action of the spring 11, in a mean position, for straight sewing, by a locking device formed by a rod 12 with a screwed end, which serves as a guide for the spring 11 and passes through a lug 13 of the support 9. To the end of the rod 12 is screwed a lock nut 14 with a counter nut.

The oscillating support 9 is provided with an arm 15 provided with an opening 16 adapted to receive the hinge spindle 16a.

Figure 7:
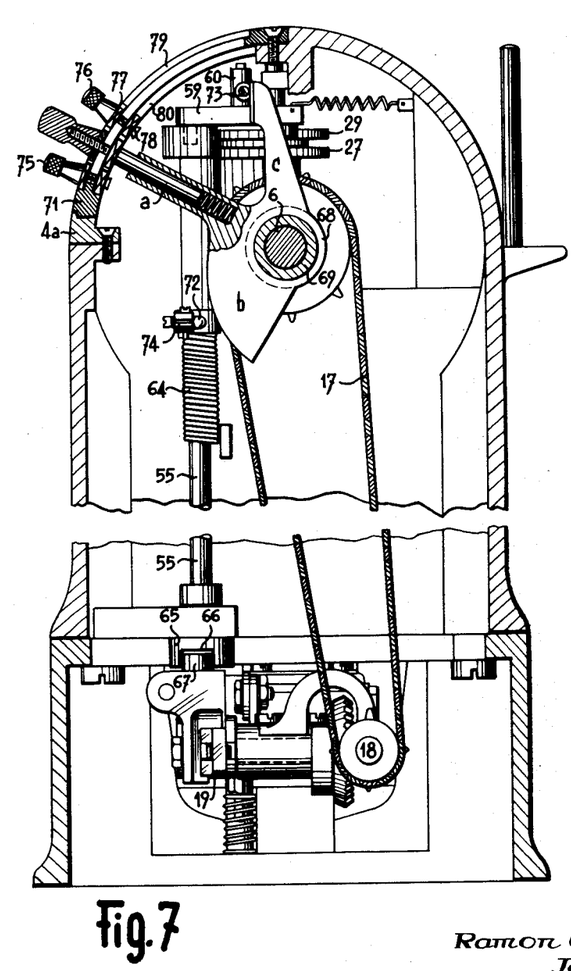
Figure 8:
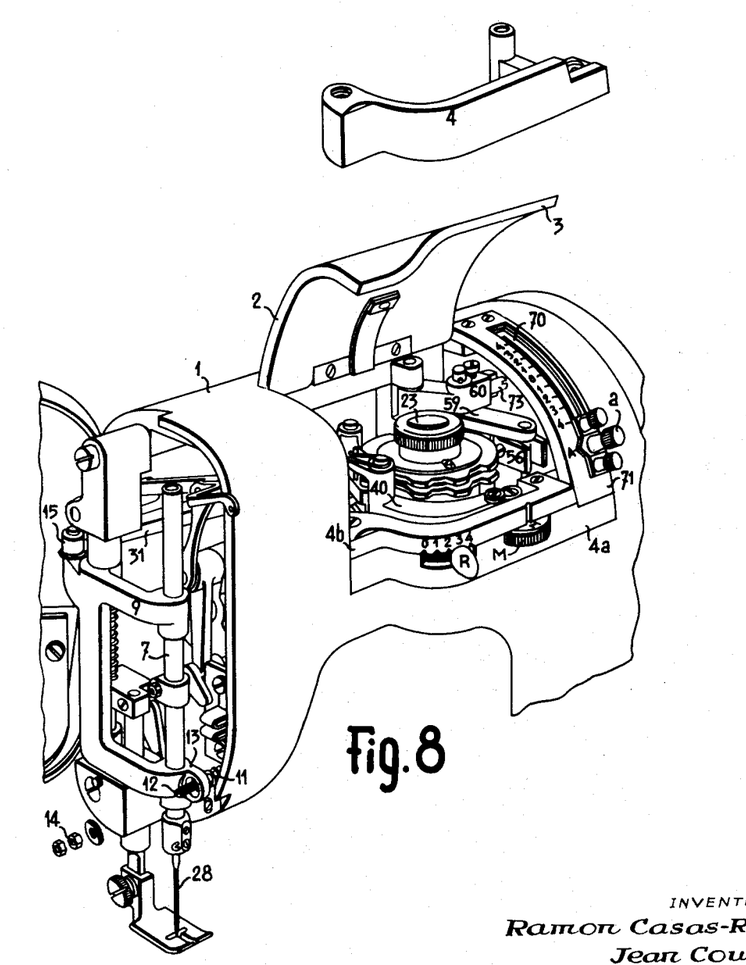
Fig. 8 shows a machine in which the members shown in Figs. 2 and 3 have been mounted.

The driving in synchronism of the feeding device with the needle-carrying bar 7 is ensured by the belt 17 which transmits the movement of the shaft 6 to the shuttle in the known manner. The movements of the feeding device in the horizontal and vertical directions are produced by a cam 19 driven by the driving shaft 18 of the shuttle (Fig. 7). The mechanism of the feeding device is not described herein, as it forms the subject of Patent No. 2,578,225 (patent application No. 84.610).

The framework of the machine is provided with two bosses 20 provided with holes 21 adapted to receive a hinge pin 21a.

The machine, such as is shown in Fig. 1 and as described above, is a simple machine, capable of carrying out straight line sewing as is shown in Fig. 9a.

Figures 2, 3:
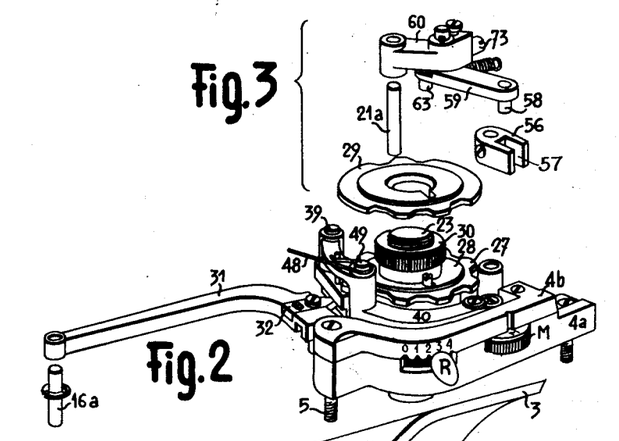
Fig. 2 shows the mechanical members which should be added to the machine according to Fig. 1 for converting it into a zig-zag machine capable of effecting automatically zig-zag sewing of variable amplitude varying in a predetermined manner and also capable of carrying out automatically zig-zag sewings with multiple stitches.
Fig. 3 shows other members capable of being added so that the machine is capable of effecting sewing with more complex stitches of ornamentation, obtained by complementary movements of the fabric, of an amplitude and direction varying in a predetermined manner.
Figure 4:
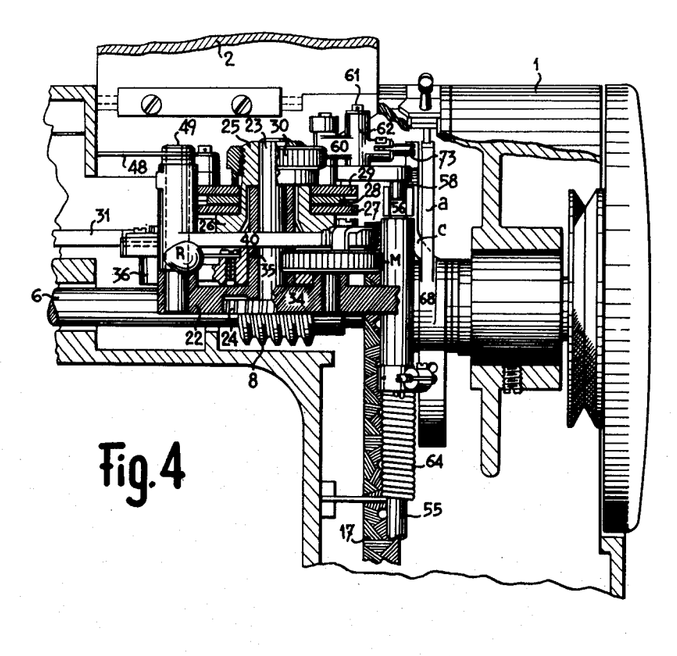
Fig. 4 is a view showing the mounting of the members shown in Figs. 2 and 3.
Figure 5:
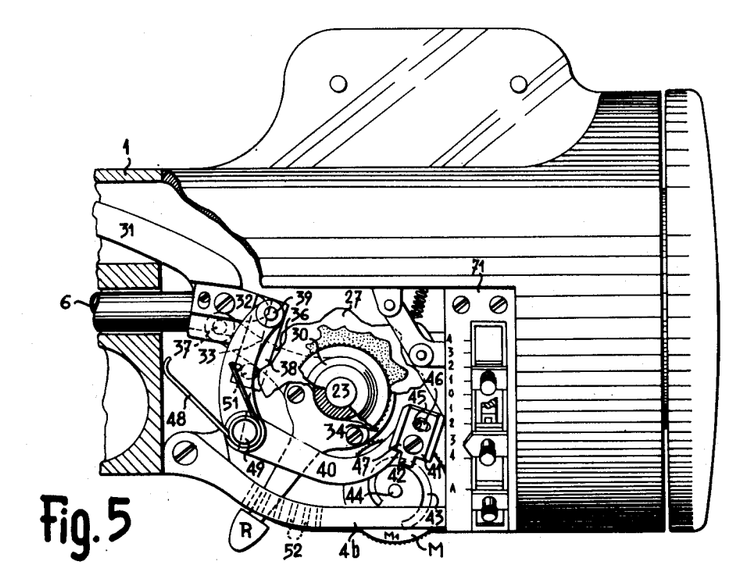
Figs. 5, 6 and 7 show the manner in which the mechanical connections are effected.

For converting this machine into a zig-zag machine capable of carrying out automatically zigzag sewings of variable amplitude varying in a predetermined manner and also capable of carrying out automatically zig-zag sewings with multiple stitches, there are added thereto the group of members shown in Fig. 2, after removing the part 4. The latter is replaced by a support formed by the parts 4a and 4b which together have externally exactly the same shape as the part 4. The part 4a forms a support for a bearing 22 (Fig. 4) to which it is secured and for a vertical shaft 23 turning in this bearing and carrying a helicoidal wheel 24 adapted to come into engagement with a worm 8 rigid with shaft 6. To the upper end of the shaft 23 is secured a threaded part 25 provided with a cylindrical part and a shoulder 26 adapted to serve as a support for at least one cam 27 and a washer 28 forcing the cam 27 against the shoulder 26 by a nut 30 screwed on part 25. The cam 27 is connected mechanically to the oscillatory support 9 of the needle-carrying bar 7, by means of an arm 31 hinged to the spindle 16a by one of its ends to the said support 9 and carrying at its other end a finger 32 held in contact with a bearing surface 33 by the spring 11 after removing the nut 14. The position of the finger 32 along the bearing surface 33 is defined by an operating member R secured to a sleeve 34 (Figs. 4, 5) turning freely on an external cylindrical extension 35 of the bearing 22. The sleeve 34 carries an arm 36 of which the end is provided with a finger 37 engaging with a groove provided in the end of the arm 31. The bearing surface 33 is secured to a lever 38 hinged at 39 to the end of one of the arms of the actuating lever 40 of which the second arm carries a plate 41. The latter has a finger 42 engaging with a groove 43 in the form of a spiral provided in an operating member M turning on a spindle 44 secured to the support 4a of the machine. The operating member M is formed by a milled disc of which a portion of the periphery projects from the casing of the machine as shown in Figure 5. The angular position of the plate 41 may be modified and secured by means of an eccentric 45 secured to the lever 40, engaging with an opening 46, and a locking member 47 formed by a screw. The spring 48 tends to turn the lever 40 in a clockwise direction, about its fulcrum pivot 49 secured rigidly to the support 4a. Finally the lever 38 also carries a finger 51 normally held in contact with the profile of the cam 27 by the action of the spring 11.

The positions of the operating member R are defined by a finger engaging, under the natural resiliency of the member R, with recesses 52 provided in the part 4b.

The operation of the above described needle-carrying device 9 in an oscillating movement is as follows:

When the main shaft 6 turns, it drives the cam 27 which, in turn, actuates the finger 51, held in contact with the profile of the cam 27. The finger 51 has thus imparted thereto a to-and-fro movement against the action of the spring 11. Thus, the lever 38 carries out an oscillating movement about its axis 39 and actuates the support 9 in a similar movement through the medium of the arm 31 carrying the finger 32 held in contact with the bearing surface 33. The amplitude of oscillating movement of the support 9 and of that of the needle-carrier 7, is a function of the position of the finger 32 along the bearing surface 33. In fact, the further the finger 32 is removed from the pivotal point 39 of the lever 38 on the lever 40, the greater the amplitude of oscillating movement of oscillation of the needle-carrier 7.

The oscillation of the support 9 produces movements of the needle-carrier 7 parallel to itself and perpendicular to the forward movements of the feeding device. These movements of the needle-carrier 7 are synchronised with the vertical to-and-fro movement of the needle. It thus follows that the stitches formed are no longer within an extension of one another but are "zig-zag" as shown in Fig. 9b or 9c, for example. In the case of Fig. 9b, this is sewing in simple zig-zag, that is to say that the length of sewing stitches corresponds with the distance separating two extreme successive positions of oscillation of the needle.

In the case of Fig. 9c, this deals with sewing in zig-zag with multiple stitches, that is to say that between two extreme successive positions of the needle, this executes a number of sewing stitches, three in the particular case.

The position of the finger 32 along the bearing surface 33 may be modified, selected and fixed at will by operating the member R, which permits of selecting and fixing at will the amplitude of movement of the needle perpendicularly to the forward movement of the feeding device.

The operating member M enables the user to select and fix the lateral position of the needle 28 relatively to the feeding device. In fact, the angular movement of the operating member M produces, by means of the finger 42 engaged with the groove 43 in the form of a spiral, an angular movement of the lever 40 and thus of the pivot 39 of the lever 38 and, consequently, an angular movement of the support 9 about its axis 10.

With the supplementary device constructed by the assembly of members shown in Fig. 2, added to the simple machine the user can carry out the sewings shown in Figs. 9a, 9b, 9c, 9d, 9e and 9h.

In order to enable the movements of the feeding device to be controlled automatically, even in a direction contrary to the normal advance of the fabric and thus carry out sewings with more complex stitches of ornamentation, the user may also add the members shown in Fig. 3. They are formed by a cam 29 placed on the part 25 and pressed against the cam 27 and the washer 28 by the nut 30.

The mechanical connection between the cam 29 and the mechanism of the feeding device is effected by means of a control shaft 55.

Figure 6:
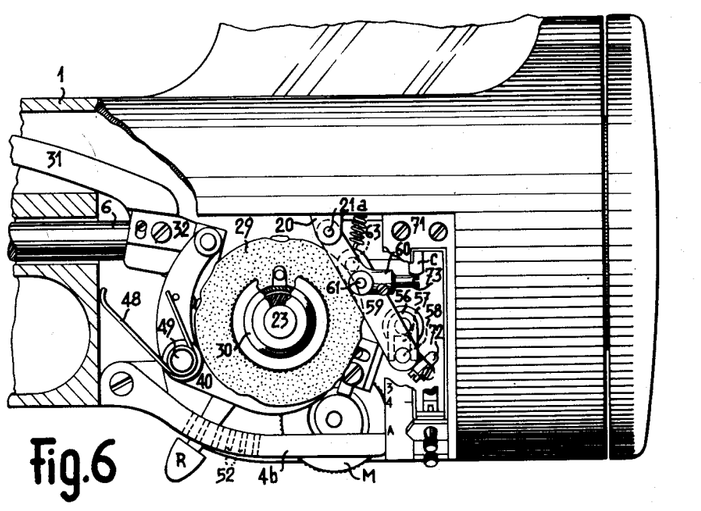

The upper end of the shaft 55 (Fig. 4) carries an actuating member 56 provided with a guide groove 57 located in a plane diametrical to the control shaft 55. The groove 57 serves as a guide for an actuating finger 58, secured rigidly to the end of one of the arms of a lever 59, pivoted to an arm 60 by means of a pivot 61, turning in a bearing 62, provided in the arm 60. The second arm of the lever 59 (Fig. 6) carries a finger 63, held in contact with the profile of the cam 29, by the action of a return spring 64, acting on the shaft 55. The arm 60 is hinged to the framework of the machine by the pivot 21a, mounted in bosses 20.

The simple machine shown in Fig. 1 is provided with a manual actuating member 68, which allows of adjusting the amplitude and the direction of the movements of the feeding device. Reference is made to Patent No. 2,578,225, dated December 11, 1951, more fully illustrating the feeding means. The actuating member is formed by a lever with three arms *a*, *b*, *c* (Fig. 7), pivoting on a bearing 69 surrounding the shaft 6. The actuating arm *a* extends from the casing of the machine through an opening 70 of a part 71 secured to the casing, whilst the arm *b* (Fig. 7) is adapted to come into engagement, according to the angular position occupied by the arm *a* along the opening 70, with a stop 72 secured to a collar 74 fixed rigidly to the shaft 55 for acting on the actuating member 65 to control the amplitude and the direction of the movements of the feeding device. Finally, the arm *a* is located between two adjustable stops 75 and 76 each formed by a shoe 77 and a nut 78 sliding in guides 79 and 80 of the part 71 and traversed by a screw with a milled head.

The lower end of the control shaft 55 carries the part 65 provided with a guide groove 66, located in a diametrical plane of the shaft 55. In this groove engages a finger 67 secured to a part of the mechanism of the feeding device controlling the feeding movement of the fabric and effecting for this purpose, a to-and-fro movement in a horizontal plane. It will be clear that according to the more or less considerable inclination of the groove 66 relatively to the plane of movement of the finger 67 and according to the direction of this inclination from one of the extreme points of oscillation of the finger 67, this produces the movement of the feeding device in one direction or the other.

Figure 9H:
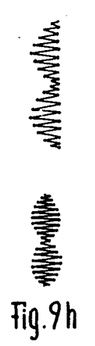
Figure 9I:
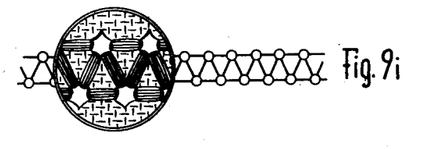

The addition of the device formed by the members shown in Fig. 3, establishes a mechanical connection between the shaft 55 and the cam 29 in such a manner that the adjustment of the amplitude and the direction of the movements of the feeding device takes place automatically, which enables the user to execute sewings with complicated stitches of ornamentation, for example as shown in Figs. 9*f*, 9*g* and 9*i*.

The arm *c* of the manual actuating member 68 is thus adapted to come into contact with the stop 73 of the arm 60 for establishing the mechanical connection connecting the cam 29 to the control shaft 55.

In the second form of construction shown in Figs. 10 to 14, the device for supporting the needle-carrying bar as also its actuating device are identical with those used in the first form of construction, except as regards the device for securing the support of the needle-carrying bar.

Figure 10:
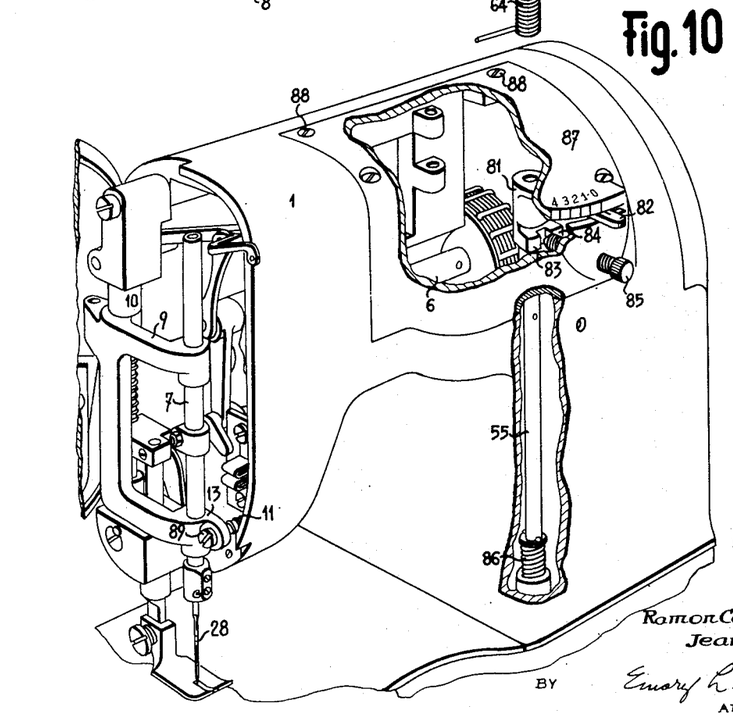
Fig. 10 is a perspective view of the upper part of the simple machine according to the second form of construction, the members necessary for its conversion into a zig-zag machine capable of effecting normal sewings in an automatic manner and also sewings with the most complex stitches of ornamentation being indicated in Fig. 11.

With reference to Fig. 10, it will be seen that the shaft 55 for adjusting the movements of the feeding device extends up to the height of the arm of the machine. It carries at its upper end a sleeve 81 secured to an arm 82 projecting from the machine with its end. This sleeve carries, on the other hand, two projections 83 and 84, cooperating with a screw 85 having a conical point for adjusting the amplitude of angular movement of the shaft 55 from one extreme position to the other.

The sleeve 81 is secured removably to the shaft 55.

Figure 11:
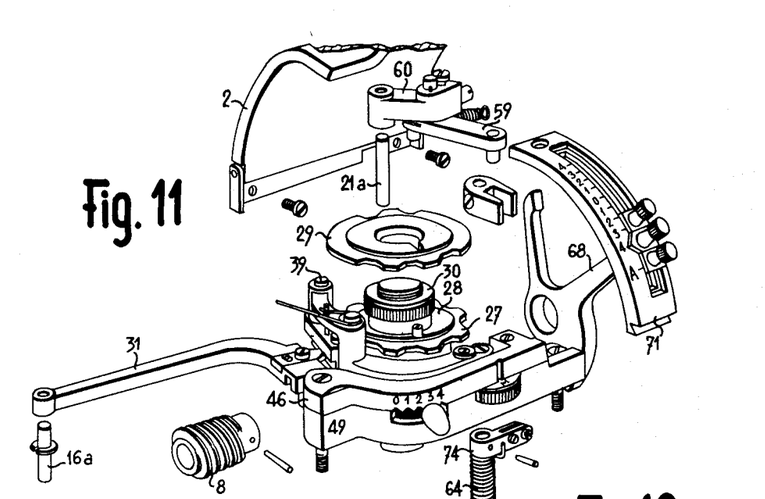

This device for adjusting the movements of the feeding device replaces that described with reference to Figs. 1 and 7 and shown on the right hand portion of Fig. 11.

For the simple machine, the movements of the feeding device are thus regulated by manually moving the lever 82, which produces an angular movement of the shaft 55 and consequently the adjustment of the feeding device by the same members as described with reference to the lower part of Fig. 7.

At the lower part of the shaft 55 is located a spring 86 for ensuring a predetermined friction between the shaft and its bearing, in such a manner that the shaft retains the position into which it has been brought.

The opening of the arm giving access to the interior of the machine is closed by a part 87 secured in position by means of a screw 88. The part 87 carries the adjusting screw 85. This opening is formed and dimensioned in such a manner that during the conversion of the machine, the closing member 87 can be replaced by the hinged cover 22 and by the part 71 shown in Fig. 11. The part 71 forms part of the device for adjusting the movements of the feeding device.

As regards the device for securing the support 9 of the needle-carrying bar 7, this comprises (see Fig. 14) a screw 89 passing through the lug 13 of the support 9 and screwing into a screwed bore 90 of the casing 1 of the machine. The screwed bore 90 passes through the wall of the casing 1 from opposite sides and a counterscrew 91 screwed from the outside of the casing 1 is provided for holding the screw 89 in a determined position. The rod of the screw 89 also serves as a guide for the spring 11 tending to push the support 9 into its exterior position of oscillation.

For a straight sewing, the support 9 is retained against the action of the spring 11 in a medial position by the screw 89.

Figure 12:
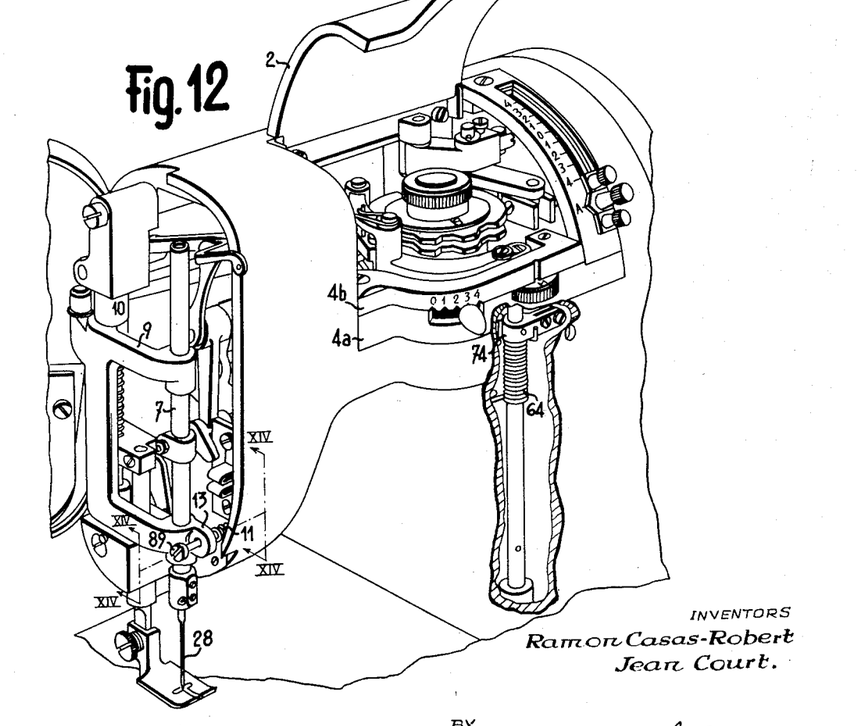
Fig. 12 shows the machine shown in Fig. 10, converted into a zig-zag machine capable of effecting automatically sewings with the most complex stitches of ornamentation by the mounting of the members shown in Fig. 11.
Figures 13, 14:
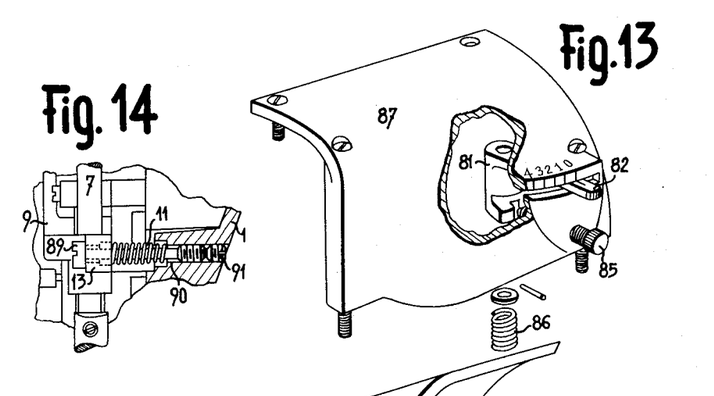
Fig. 13 shows the members replaced on the simple machine for its conversion into a zig-zag machine capable of carrying out sewings with varied stitches of ornamentation.
Fig. 14 is a sectional view of a detail taken on the lines XIV—XIV of Figure 12.

For converting the machine shown in Fig. 10 into a zig-zag machine such as shown in Fig. 12, which is capable of carrying out sewings with more complicated stitches of ornamentation, it suffices to carry out the following operations:

1. To remove the closure part 87, the sleeve 81 and the spring 86,

2. To mount the worm 8 and the control member 68 on the bearing of the driving shaft 6 and to place in position the other members shown in Fig. 11, as described for the first form of construction.

3. To unscrew for a sufficient length the screw 89 so as to enable the support 9 to oscillate. The screw 89, once unscrewed, is locked in position by the counterscrew 91.

From the foregoing description it will be seen that by the present invention the user can acquire a simple machine, which he can, when he so desires, convert into a zig-zag machine capable of carrying out sewings such as shown in Figs. 9a, 9b, 9d, 9e and which is further capable of effecting automatically zig-zag sewings of an amplitude varying in a predetermined manner, such as shown in Fig. 9h, as also sewings in zig-zag with multiple stitches such as shown in Fig. 9c.

The user may also improve this sewing machine by adding thereto the members shown in Fig. 3 (plus the members 60 and 71 for the second form of construction) and thus, by reason of the combination of two interchangeable cams obtain a sewing machine capable of effecting automatically and further sewings already referred to, sewings with more complex stitches of ornamentation such as those shown in Figs. 9f, 9g and even 9i, the latter being "Turkish" openwork.

We claim:

1. In a sewing machine, the combination comprising a support oscillatable on a vertical axis, a needle-carrying bar mounted on said support, a framework for said machine, a securing device operable to connect said oscillatory support to said framework to prevent oscillation of said support seatings in said framework, a second removable support attachable to said seatings, accessory mechanical members mounted at least in part on said second support, a first set of said accessory members connectable to said oscillatory support and when connected thereto and after operation of said securing device to disconnect the oscillatory support from the framework controlling the movements of said oscillatory support, and adjustable means for varying the amplitude of oscillation of the oscillatory support, whilst retaining the possibility of carrying out normal sewing and darning.

2. In a sewing machine, the combination according to claim 1 comprising means journaled in the framework and reciprocating said needle-carrying bar axially and including a worm, and wherein the first set of said accessory mechanical members include a wormwheel engageable with the worm, a cam fixed to the wormwheel, and an arm fulcrumed on said second removable support and operated by said cam and connectable to said oscillatory support.

3. In a machine according to claim 1, the provision of a driving shaft journaled in the framework, said driving shaft imparting axial movements to said needle-carrying bar, a driving member on said driving shaft, and an actuating member associated with said mechanical accessory members, and driving the first set of said accessory members said driving member being adapted to come into engagement with said actuating member on attaching said second support to said seatings.

4. In a machine according to claim 1, the provision of a driving shaft journaled in the framework, said driving shaft imparting axial movements to said needle-carrying bar, a driving member on said driving shaft, and an actuating member associated with said mechanical accessory members, and driving the first set of said accessory members said driving member being a worm adapted to come into engagement with said actuating member on attaching said second support to said seatings.

5. In a machine according to claim 1, the provision of a driving shaft, said driving shaft imparting axial movements to said needle-carrying bar, a driving member on said driving shaft, and an actuating member associated with said mechanical accessory members, said driving member being a worm adapted to come into engagement with said actuating member, the first set of said accessory members carried by the said removable support comprising a cam-carrying shaft, said shaft being driven by said worm, a worm wheel on said shaft, an arm pivotally mounted on the oscillating support of said needle-carrying bar and connected mechanically to a first cam on said cam shaft for producing an oscillating movement of said oscillation support.

6. In a machine according to claim 1, the provision of a driving shaft, said driving shaft imparting axial movements to said needle-carrying bar, a driving member on said driving shaft, and an actuating member associated with said mechanical accessory members, said driving member being a worm adapted to come into engagement with said actuating member, the first set of said accessory members carried by the said removable support comprising a cam-carrying shaft, said shaft being driven by said worm, a worm wheel on said shaft, an arm pivotally mounted on the oscillating support of said needle-carrying bar and connected mechanically to a first cam on said cam shaft for producing an oscillating movement of said oscillating support, the second set of said accessories comprising mechanical connecting members between a second cam on said cam-carrying shaft, a feeding device and a control shaft for cooperation with said feeding device for the purpose of regulating automatically the amplitude of the feed movements of a fabric into the machine and the direction of its feed movement.

7. In a simple sewing machine, the combination comprising a needle-carrying arm, a support oscillating on a vertical axis, a needle-carrying bar mounted on said support a securing device associated with said support, said securing device serving to maintain said support in a mean fixed position, a framework for said machine, seatings on said framework for securing a removable support to said seatings, an actuating lever in the upper part of said machine, a casing enclosing said machine, said lever projecting from said casing, a feeding device, a control shaft for regulating the movements of said feeding device, said lever being mounted on said control shaft, said shaft extending up to the height of said needle-carrying arm.

8. In a machine according to claim 7 the provision of a regulating device, said regulating device regulating the angular position, from one extreme position to another extreme position, of the control shaft for regulating the movements of the feeding device.

9. In a machine according to claim 7, the arrangement wherein the control shaft for regulating the movement of the feeding device carries a spring which ensures a predetermined amount of friction between said shaft and a bearing in which it is mounted.

10. In a machine the combination comprising a support oscillatable on a vertical axis, a needle-carrying bar mounted on said support, a framework for said machine, a securing device operable to connect said oscillatory support to said framework, a seating in said framework, a removable support secured to said seating, accessory mechanical members mounted at least in part on said seating, a first set of said accessory members controlling the movements of said oscillatory support, a second set of said accessory mechanical members, a feeding device having its movement controlled by the second set, an actuating lever in the upper part of said machine, a casing enclosing said machine, said lever projecting from said casing, a control shaft for regulating the movements of said feeding device, said lever being mounted on said control shaft, said shaft extending up to the height of said needle-carrying arm, an opening in said casing, a closure member for said opening, said closure member being so shaped and dimensioned as to be capable of receiving, when the machine is being converted, a hinged cover and a stationary member forming part of said device for regulating the amplitude of the movements of said feeding device.

11. In a machine according to claim 2, the arrangement wherein said device for fixing said oscillating support comprises a screw engaging a lug of said support, said casing having a screw threaded bore therein into which said screw screws, the stem of said screw serving as a guide for a spring tending to push said support into its outer position of oscillation.

12. In a machine according to claim 2, the arrangement wherein said device for fixing said oscillating support comprises a screw engaging a lug of said support, said casing having a screw threaded bore therein into which said screw screws, the stem of said screw serving as a guide for a spring tending to push said support into its outer position of oscillation, said screw threaded bore passing from one side to the other of the wall of said casing, a counter screw being screwed from the outside of the said casing and serving to maintain the said screw in a predetermined position.

RAMON CASAS-ROBERT.
JEAN COURT.

References Cited in the file of this patent

UNITED STATES PATENTS

| Number | Name | Date |
|---|---|---|
| 2,519,452 | Galkin | Aug. 22, 1950 |

FOREIGN PATENTS

| Number | Country | Date |
|---|---|---|
| 656,235 | Germany | Feb. 1, 1938 |